F. O. BOSWELL.
VEHICLE SUSPENSION AND SHOCK ABSORBER.
APPLICATION FILED APR. 25, 1917.
1,261,350.
Patented Apr. 2, 1918.
2 SHEETS—SHEET 1.
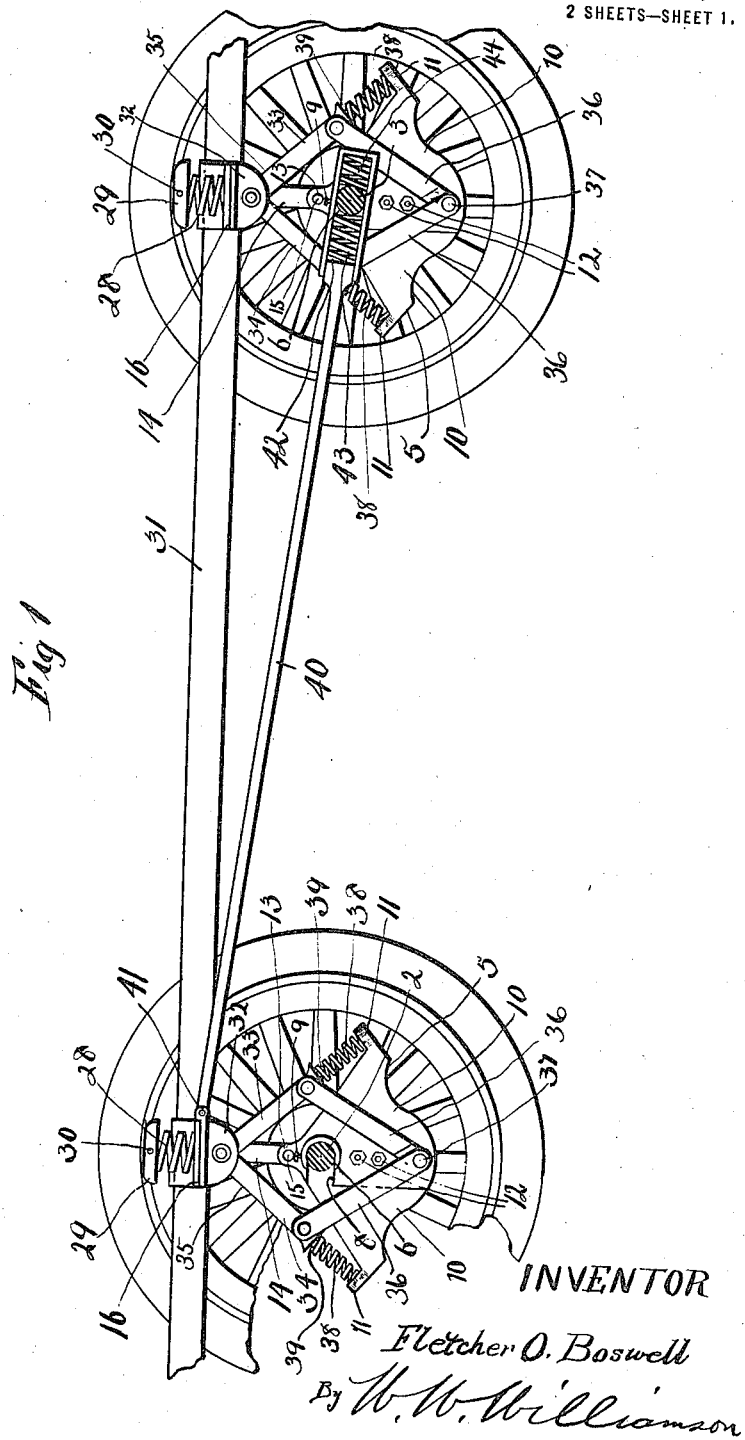
INVENTOR
Fletcher O. Boswell
By W. W. Williamson
Atty.

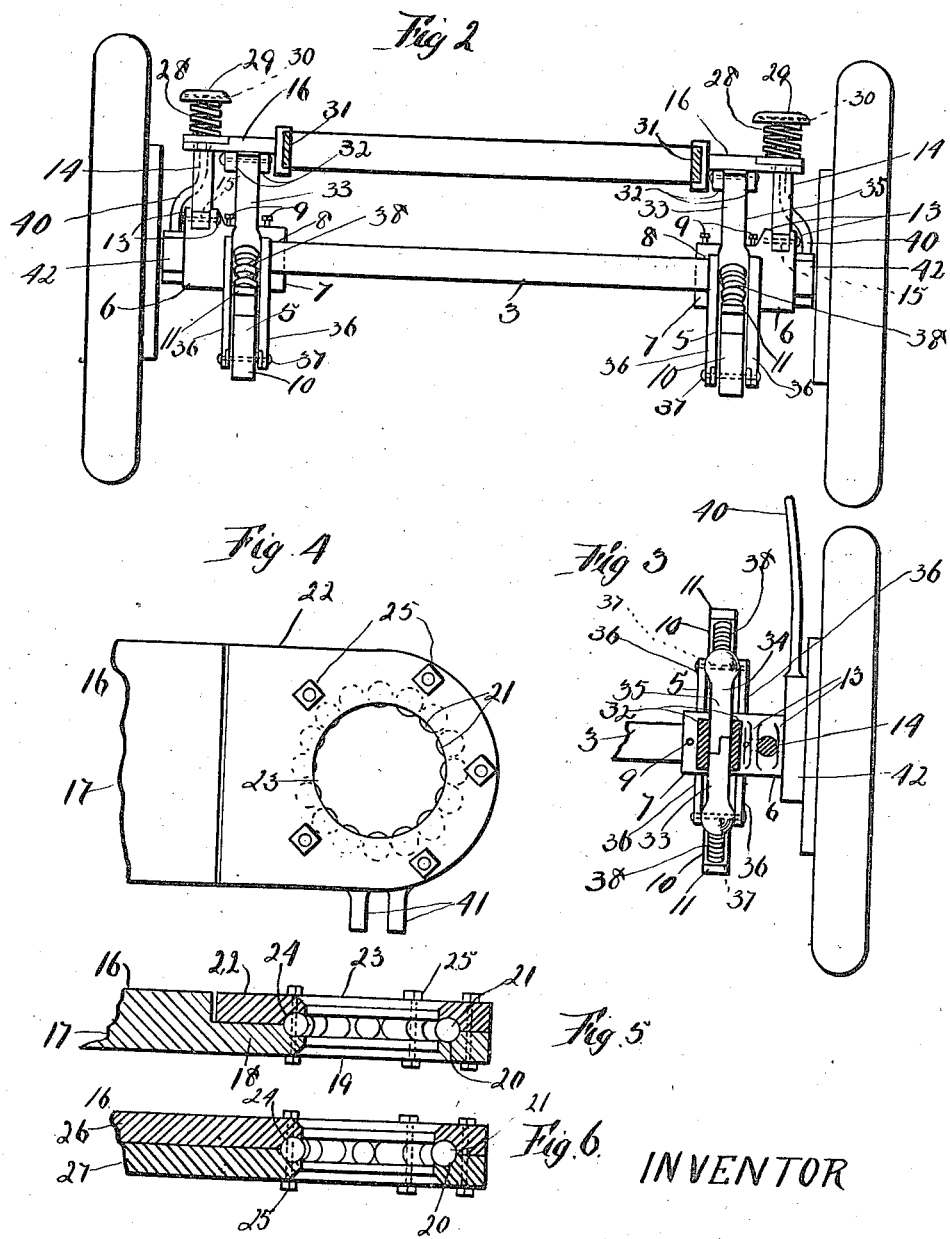

UNITED STATES PATENT OFFICE.

FLETCHER O. BOSWELL, OF PHILADELPHIA, PENNSYLVANIA, ASSIGNOR TO F. O. B. MANUFACTURING COMPANY, OF PHILADELPHIA, PENNSYLVANIA, A CORPORATION OF DELAWARE.

VEHICLE SUSPENSION AND SHOCK-ABSORBER.

1,261,350.  Specification of Letters Patent.  Patented Apr. 2, 1918.

Original application filed October 13, 1916, Serial No. 125,506. Divided and this application filed April 25, 1917. Serial No. 164,327.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Suspensions and Shock-Absorbers, of which the following is a specification.

This application is a division from my application for Letters Patent Serial Number 125,506, filed October 13, 1916, and relates to new and useful improvements in a vehicle suspension and shock absorber, the object of which is to provide a device of this character which will displace the ordinary vehicle springs, and which will absorb the shock incident to the vehicle passing over obstructions upon the road.

Another object of the invention is to provide a device of the character above stated which may be readily and quickly substituted for the springs of a complete vehicle or which may be made a part of the vehicle during the building of the same.

A further object of the invention is to provide a vehicle suspension consisting of a pair of coacting sleeves each having a plate or support formed integral therewith, projecting in opposite directions, said plates acting as supports for the ends of the springs, and one end of a toggle lever working on said springs, the other end of said lever being connected to extension bars attached to the vehicle frame, each of said extension bars being provided with a hole for registering with a post or upright pivoted to one of the sleeves, said bars carrying ball bearings in the region of the holes to reduce the friction upon the posts or uprights.

A still further object of the invention is to provide strut rods connecting the forward portion of the device with the rear axle, so as to brace the same and hold the different elements in a virtually upright position.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a side elevation of the running gear of a vehicle, the near side wheels being removed and showing my invention applied thereto.

Fig. 2, is an end view thereof.

Fig. 3, is a fragmentary plan view of one of the devices, showing the ears in section to which the upper end of the toggle lever is connected.

Fig. 4, is an enlarged plan view of one end of the extension bar.

Fig. 5, is a longitudinal sectional view thereof; and

Fig. 6, is a similar view of a slightly modified form of extension bar.

In carrying out my invention as here embodied, 2 and 3 represent the axles of a vehicle having a pair of identical devices 5 embodying my invention mounted thereon, one located at each end of the axles. Each of these devices otherwise known as a vehicle suspension and shock absorber consists of two interlocking sleeves 6 and 7, each having an open slot or groove 8 for registering with the axle, so that said sleeves partially surround the axle with the open portions of the sockets located on opposite sides of the axle, and when the sleeves are in place, they are securely held in position by means of set screws 9 or their equivalent.

The sleeves each have a triangular supporting plate 10 formed integral therewith, depending from the sleeve with portions projecting in opposite directions, and these oppositely projecting portions are provided with spring supporting lugs 11. The portions of the plates directly beneath the sleeves are of less thickness than the balance of the plates and these portions overlap with their edges resting against the shoulders formed by the different thicknesses of metal, as will be obvious. In order to hold these plates, as well as the sleeves with which they are formed in proper relation to each other, I fasten them together by bolts 12 or their equivalent. One of the sleeves, as 6, of each of the members is provided with a pair of upwardly projecting ears 13 between which is pivotally mounted or journaled the lower end of an upright or post 14 by a stud or pivot pin 15 formed with the post 14 and projecting into the ears or made separately from said post and passing through the ears and the post, after which it may be secured to one of the parts.

On the posts are vertically slidably mounted the extension bars 16 and as shown in Figs. 4 and 5, each comprises a relatively thick body portion 17 with a reduced end portion 18, in which is formed a hole 19, and surrounding this hole is formed an annular groove 20 acting as a portion of a ball race in which the ball bearings 21 are located, the same being held in position by a segment 22 having a hole 23 therein and provided in the region of said hole with an annular groove 24 to match the groove 20 and complete the ball race.

The segment is held in position upon the reduced end of the extension bar by means of bolts 25 or their equivalent.

In Fig. 6, I have shown a slightly modified form of construction of extension bar, wherein said bar is made of two identical body members 26 and 27 each having the holes and grooves above referred to for placing the same upon the uprights or posts, and providing the means for housing the ball bearings.

The extension bars being mounted upon the posts which project through the holes therein, can slide up and down on said posts with a relatively small amount of friction, because of the ball bearings, and surrounding each of these posts is a coiled spring 28, one end of which engages the upper face of the extension bars with the other ends contacting with the caps 29 secured to the upper ends of said posts in any suitable manner as by pins 30.

The extension bars 16 may form a part of the chassis or vehicle frame, or they may be secured to the frame which is represented by the side bars 31. The extension bars 16 are provided adjacent their inner ends with depending brackets or ears 32 between which are pivoted the arms 33 and 34 of the toggle lever 35, and to the lower or outer ends of each of these arms are pivoted a pair of links 36, one of which is located on each side of each arm and the plates 10, the opposite ends of all of said links being pivoted to the stationary pivot pit or short shaft 37 carried by the plates 10 and projecting from opposite faces thereof, as will be readily understood.

Coacting with each of the joints of the toggle lever formed by the connection of the links with the arms is one end of some suitable resilient means 38 composed of one or more springs, the opposite end resting against the lug or projection 11, the ends of the springs coacting with the toggle lever, preferably engaging the lower or outer ends of the arms 33 and 34, and said springs are held against accidental displacement in any suitable manner as by surrounding small lugs 39 projecting from the arms 33 and 34.

To some suitable portion of the forward extension bars such as the rearwardly projecting ears 41 are pivoted the forward ends of the strut rods 40, and the rear ends of these strut rods are bifurcated or provided with spring chambers 42 with which registers the rear axle 3, said axle projecting through said housings of each strut rod, and within this spring chamber are located two counteracting springs 43 and 44, and these strut rods brace the forward portion of the vehicle, and in particular hold the forward uprights or posts 14 in a virtually vertical position and through said posts, the forward extension bars, the vehicle frame and the rear extension bars hold the rear uprights or posts in a virtually vertical position, while the counteracting springs of said strut rods permit a restricted longitudinal movement of the chassis or vehicle body when certain obstructions are encountered by the wheels of the vehicle.

In the operation of my invention, when the distance between the pivot points 32 and 37 is decreased, the distance between the pivot points of the toggle lever in horizontal alinement is increased, so that said last named pivot points are moved toward the lugs or projections 11, thereby causing the springs 38 to be depressed or contracted. This action is caused by the wheels of the vehicle coming in contact with some obstruction, and as soon as said obstruction is passed or the effects of the shock overcome, the springs 38 will expand and return the toggle lever to its normal position. As the toggle lever is returned to its normal position, the body is forced upward against the action of the springs 28, which act as buffers to prevent the sudden return of the vehicle body to its normal position. The extension 16 being provided with holes for registration with the posts 14 are prevented from moving sidewise or backward and forward, independent of the posts 14, thereby reducing the swinging motion of the vehicle body and restricting said swinging motion to the amount of compression of the springs 43 and 44, said springs permitting sufficient longitudinal swinging of the body to absorb the shock incident to striking an obstruction head on.

By constructing the vehicle suspension and shock absorber in the manner above described, relatively few parts are necessary, so that a more compact arrangement is obtained, and the different elements are so positioned that they may be readily detached and replaced, permitting a vehicle to be easily and quickly equipped with very little loss of time and at a relatively small expense.

Of course I do not wish to be limited to the exact details of construction as here shown, as these may be varied within the limits of the appended claims without departing from the spirit of my invention.

Having thus fully described my invention, what I claim as new and useful, is—

1. A vehicle suspension and shock absorber comprising supports detachably secured to the axles of a vehicle, extension bars connected with the vehicle body, toggle levers pivoted to the extension bars and to the supports, and springs arranged between said supports and the opposite horizontal pivot points of the toggle levers for the purpose described.

2. A vehicle suspension and shock absorber comprising in combination with a vehicle, axles, each end of said axles carrying a plurality of interlocked sleeves, a supporting plate formed integral with each sleeve, the coacting plates adapted to overlay each other and be fastened together, lugs or spring supports carried by said plates, toggle levers pivoted to the vehicle body and the supporting plates, and springs arranged between the lugs of said plates and the joints of the toggle levers adapted to be depressed at the time of the decrease in distance between the vehicle body and the axles.

3. A vehicle suspension and shock absorber comprising in combination with a vehicle, axles, each end of said axles carrying a plurality of interlocked sleeves, a supporting plate formed integral with each sleeve, the coacting plates adapted to overlap each other and be fastened together, lugs or spring supports carried by said plates, extension bars connected with the vehicle body, depending brackets or ears carried by said extension bars, arms pivoted to said depending brackets, links pivoted to the lower or outer ends of the arms and to the supports in vertical alinement with the pivot points of the upper ends of the arms, and springs located between the lugs and the outer or lower ends of the arms.

4. A vehicle suspension and shock absorber comprising in combination with a vehicle, axles, a pair of interlocked sleeves detachably secured to the ends of each axle, a supporting plate formed integral with each sleeve, the coacting plates adapted to overlap each other and be fastened together, lugs or spring supports carried by said plates, uprights or posts having their lower ends journaled in one of the sleeves of each coöperating pair of interlocked sleeves, extension bars each provided with a hole and having ball bearings located in the region of said holes, said extension bars adapted to be vertically slidably mounted upon the uprights or posts with the latter projecting through the holes, arms pivoted to the extension bars, links pivoted to the lower outer ends of said arms and to the supporting plates in vertical alinement with the pivot points of the upper ends of the arms, and springs located between the lower outer ends of said arms and the lugs carried by the plates.

5. A vehicle suspension and shock absorber comprising in combination with a vehicle, axles, a pair of interlocked sleeves detachably secured to the ends of each axle, a supporting plate formed integral with each sleeve, the coacting plates adapted to overlap each other and be fastened together, lugs or spring supports carried by said plates, uprights or posts having their lower ends journaled in one of the sleeves of each coöperating pair of interlocked sleeves, extension bars each provided with a hole and having ball bearings located in the region of said hole, said bars adapted to be vertically slidably mounted upon the uprights or posts with the latter projecting through the holes, arms pivoted to the extension bars, links pivoted to the lower outer ends of said arms and to the supporting plates in vertical alinement with the pivot points of the upper ends of the arms, springs located between the lower outer ends of said arms and the lugs carried by the plates, a cap on the upper end of each of the uprights or posts, and a spring coiled about each post and located between the extension bars and the caps on said posts.

6. A vehicle suspension and shock absorber comprising in combination with a vehicle, axles, a pair of interlocked sleeves detachably secured to the ends of each axle, a supporting plate formed integral with each sleeve, the coacting plates adapted to overlap each other and be fastened together, lugs or spring supports carried by said plates, uprights or posts having their lower ends journaled in one of the sleeves of each coöperating pair of interlocked sleeves, extension bars each provided with a hole and having ball bearings located in the region of said hole, said bars adapted to be vertically slidably mounted upon the uprights or posts with the latter projecting through the holes, arms pivoted to the extension bars, links pivoted to the lower outer ends of said arms and to the supporting plates in vertical alinement with the pivot points of the upper ends of the arms, springs located between the lower outer ends of said arms and the lugs carried by the plates, a cap on the upper end of each of the uprights or posts, a spring coiled about each post and located between the extension bars and the caps on said posts, strut bars pivoted to the forward extension bars, each of said strut bars having a spring chamber at its rear end through which the rear axle of the vehicle projects, and a pair of counteracting springs located in each of the spring chambers coacting with the strut bar and opposite sides of the rear axle.

In testimony whereof, I have hereunto affixed my signature.

FLETCHER O. BOSWELL.